United States Patent [19]

Gorbunow

[11] 4,020,029
[45] Apr. 26, 1977

[54] TACKIFIER

[75] Inventor: Walter Gorbunow, Coon Rapids, Minn.

[73] Assignee: PDI, Inc., St. Paul, Minn.

[22] Filed: Oct. 1, 1975

[21] Appl. No.: 618,516

[52] U.S. Cl. .............................. 260/24; 260/27 R
[51] Int. Cl.² .................................. C08L 91/00
[58] Field of Search ............... 260/24, 27; 154/129

[56] References Cited

UNITED STATES PATENTS 2,664,378   12/1973   Heller .................................. 260/27

FOREIGN PATENTS OR APPLICATIONS 1,154,174   6/1969   United Kingdom .................. 260/24

*Primary Examiner*—Melvyn I. Marquis
*Assistant Examiner*—W. E. Parker
*Attorney, Agent, or Firm*—Orrin M. Haugen

[57] ABSTRACT

A normally inert coating composition activatable under heat and pressure to form a tacky film and adapted for application to gripping handles of hand-held instruments and comprising a combination of two or more plastic resinous substances, each of which individually forms a continuous film at room temperature. At least one of the resins has a softening point (Ring & Ball) between about 55°–75° C., and at least one of the resins has a higher softening point of between about 90°–120° C. For application, the resins are retained in a solvent solution capable of forming a clear continuous coating which, when pressed or rubbed lightly with hand pressure, will appear smooth and tack-free, but when subjected to body temperature heat and hand pressure, will become tacky. When heat and pressure is removed, the coating will revert to its non-tacky, normally inert state.

3 Claims, No Drawings ize: 4,020,029

TACKIFIER

BACKGROUND OF THE INVENTION

The present invention relates generally to an improved resinous material, and more specifically to such a material capable of forming a continuous film at room temperature. The film is normally inert, but is activatable under heat (body temperature) and pressure to form a tacky film. The composition is particularly adapted for application to gripping handles of hand-held instruments, particularly sporting equipment such as tennis racquets, golf clubs, baseball bats and the like. In addition, the composition is adaptable for application to the gripping handles of handheld instruments such as hand tools, including hammers, staple guns, or the like.

In the utilization of a tacky film for enhancing the gripping characteristics of handles of hand-held instruments, it is desirable to have a film which becomes tacky during use, but which, during periods of non-use, is inert, dormant, or otherwise non-tacky. Such coatings are desirable for use on various equipment which, when not used, may be exposed to dirt, dust, and the like. When the tacky condition persists following exposure to heat and pressure, the gripping handle will, of course, pick up dust or dirt particles and thus render the surface undesirable for utilization, and the tacky condition, will, under these conditions, be lost. It is desirable, therefore, to provide a coating which is capable of becoming tacky to the touch when desired, with the tacky condition being one which is promptly lost upon removal of the instrument from the hands of the user.

SUMMARY OF THE INVENTION

The composition of the present invention is one which provides a normally inert coating composition which is activatable under exposure to hand gripping, to a tacky film which enhances the grip of the user. The film remains tacky so long as a gripping force is applied to the surface of the coated handle, but is rapidly lost upon removal of the gripping force. Under the circumstances, therefore, the coating is ideally suited for application to hand-held sporting goods such as tennis racquets, golf clubs, baseball bats and the like. Specifically, with baseball bats, the gripping handle when utilizing the coating composition of the present invention becomes tacky and assists the player in his gripping of the handle, and improves the rigidity of the hold. Upon striking the ball, for example, the player will immediately release the bat from his hand, and because of the quick response of the composition, in the time required for the bat to fall to the ground, the tacky condition will be lost and large quantities of dirt will not be picked up by the surface of the bat. The same rationale applies to the hand-held tennis racquet and golf club.

Briefly, in accordance with the present invention, a coating composition activatable under heat and pressure to form a tacky film is provided, wherein two or more plastic resinous substances are dispersed in a solvent solution suitable for application to the surface to be gripped. The resins are selected so as to have first and second softening points, the first softening point (Ring & Ball) being between 55° C., the second softening point being substantially greater, and specifically between about 90° and 120° C. The solution when applied to a gripping handle will lose the solvent by evaporation and form a clear continuous coating having good adhesion to the coated surface, and good cohesion so as to form a second firm film. When pressed or rubbed lightly, the film will appear smooth and tack-free, but when subjected to the heat and pressure involved in hand gripping, the film develops tack. This tack is developed under subjection to heat in the range of about 35° C. along with the mild hand pressure available from hand gripping. The tacky condition is one which is lost immediately upon removal of the combined heat and pressure.

Therefore, it is a primary object of the present invention to provide an improved coating composition for gripping handles of hand-held instruments, the composition being activatable under the heat and pressure developed by hand gripping to form a tacky film, the tacky condition which develops in response to the hand gripping being quickly lost upon removal of the heat and pressure condition.

It is a further object of the present invention to provide an improved coating composition which develops a tacky film upon subjection to the heat and pressure developed on hand gripping, and being adapted to be applied to the gripping handles of hand-held instruments such as sporting goods and the like, the tacky condition which develops upon exposure to hand gripping being lost quickly upon removal of the gripping force.

Other and further objects of the present invention will become apparent to those skilled in the art upon a study of the following specification and appended claims.

DESCRIPTION OF THE PREFERRED EMBODIMENT

In order to best describe the various aspects of the present invention, the following specific examples are provided.

EXAMPLE 1

A coating composition was prepared having the following formulation:

| Component | Parts by Weight |
| --- | --- |
| Cumar R-19 (coumarone-indene resin) (softening point 60° C.) | 8 |
| Pentalyn H (Pentaerythritol ester of rosin) (softening point 105° C.) | 10 |
| Petrolene | 82 |

The coumarone-indene resin is a coal tar resin obtained by heating mixtures of coumarone and indene (such as occur in the light-oil fraction from coal-tar refining) with sulfuric acid so as to cause polymerization to thermoplastic materials. The softening point of the material being utilized is at about 60° C. This resin is avialable commerically from Allied Chemical Corp., Plastics Division, New York, N.Y. Specifically, the cumar resin utilized is a neutral, stable, synthetic resin of the para-coumarone-indene type manufactured from tar distillates.

The pentaerythritol ester of rosin is likewise commerically available, specifically from Hercules Powder Company, Inc. of Wilmington, Del. Pentalyn H is the pentaerythritol ester of rosin and provides the cohesive strength necessary in the entire formulation to prevent separation or fragmentation of the dried film, and furthermore provides sufficient adhesion to contribute to the adhesion necessary for the applied coating on the substrate.

Petrolene is an aliphatic hydrocarbon solvent prepared by straight-run distillation techniques. This material is commercially available from APCO Oil Corp. of Oklahoma City, Okla.

The lower softening point resin, that is, the coumaroneindene resin provides adhesion to the substrate to be coated, provides flexibility fo the dried coating to reduce or eliminate cracking or chipping. Furthermore, the lower softening point material activates under heat and pressure to give the desired gripping qualities.

A higher melting point resin contributes adhesion to the surface to be coated, and provides the necessary cohesive strength to prevent film separation or delamination, while protecting the dried film surface from adhering to excessive quantities of dirt or dust when in a dormant or non-activated state.

EXAMPLE 2

The following formulation was prepared:

| Component | Parts by Weight |
|---|---|
| Polypale Ester 10 (glycerol ester of polymerized rosin) (softening point 114° C.) | 12 |
| Cumar R-19 (coumarone-indene resin) (softening point 60° C.) | 8 |
| Xylol (aromatic solvent) | 80 |

The glycerol ester of polymerized rosin is available commerically from Hercules Powder Company, Inc. of Wilmington, Del. The glycerol ester provides the high softening point material, as well as the tackifying property. The Xylol is a commercially available aromatic solvent consisting of xylene.

It will be appreciated that the products of Examples 1 and 2 may be formulated in aerosol form utilizing a conventional aerosol propellant. As such, the user may spray the material upon the gripping handle as required. As an alternate, a solvent solution may be applied by suitable techniques such as dipping, brushing, wiping or spraying. As such, the coating does not require auxiliary heating, presence of catalysts, or other curing mechanisms, with the evaporative features of the solvent being sufficient to prepare the coating in an adherent and coherent film form.

As has been indicated, the gripping qualities of the instrument to which the coating is applied, such as has been indicated herein is improved when the body heat and hand pressure available from hand gripping is provided. Gripping may also be improved from guard rails, hand rails, wheelchairs and other articles or surfaces where hand gripping may be frequent.

The films of the present invention are characterized by a rapid loss of the tacky condition upon removal of heat and pressure. As such, the film does not rapidly pick up dirt, dust or other debris when not being utilized.

As has been indicated, two separate resin materials are employed having distinct and discrete softening points. If only one such resin were to be employed, for example, the higher softening point resin, adhesion and cohesion would be present in the film, but the gripping quality would not appear when heat and pressure were applied. Furthermore, such a resin may tend to provide a chipping or cracking film upon flexure. On the other hand, if only the lower softening point resin were to be employed, the gripping qualities and tackifying features would exist, however the film would tend to remain tacky for extended periods of time and furthermore would tend to pick up excessive quantities of surface dirt and film, Furthermore, because of inadequate cohesive strength of the dried film, there would be a tendency of the film to separate and cause transfer or release from the surface.

PHYSICAL PROPERTIES OF THE FILM

The physical properties are such that the adhesion is sufficiently great so as to avoid removal or lifting of the film upon use. In other words, when contact is made between the film and the hand, even a gloved hand, the adhesion is sufficiently great so as to prevent transfer of the film to the surface of the bare or gloved hand. Furthermore, the cohesive strength is sufficiently great so as to prevent any partial lifting of the film and ultimate transfer. In the past, tacky films have been utilized which retain their tacky condition even when not under the influence of hand gripping, and as such, continually pick up and receive dirt, debris and the like, and ultimately lose the tacky condition.

The individual components of the film are such that skin irritation does not become a problem. Furthermore, the surface is uniform and durable, and maintains its gripping characteristics for extended periods of time. The surface is sufficiently durable so as to permit cleaning with warm water and soap, followed by a water rinse, or alternatively by utilizing a solution of isopropyl alcohol and water. Preferably, the selection of resins is provided so as to give reasonable resistance to ultraviolet degradation or ozone degradation, which may accelerate the deterioration of the coating, once applied. The components of the present system, as set forth in Examples 1 and 2, provide an extended useful life, up to several months in some cases.

It has been indicated that the coumarone-indene resin is present in 8 parts by weight, this component may be contained in the formulation in a range of from 6 to 12 parts by weight. Also, the pentaerythritol ester of rosin, while being indicated as present in an amount of 10 parts by weight, may be present in a range of between about 8 and 12 parts by weight.

In the formulation of Example 2, the glycerol ester of polymerized rosin, while being indicated as present in 12 parts by weight, may be present in a range of between about 8 to 12 parts by weight, and the coumarone-indene resin may be present in the range of between about 6 to 12 parts by weight. In each instance, the balance is aliphatic hydrocarbon solvent having an initial boiling point of 60° – 63° C., with 95% distilling between 60° and 93° C. The specific gravity of Petrolene is about 0.7.

Based on the solids present, the lower melting resin preferably comprises between about 33 to 60% of the solids content, with the higher melting point resin being the balance of between 40 and 67%. The remainder is, of course, a volatile solvent which acts as a carrier for depositing the resin on the treated surface. Based upon the ratios given, the total solids could be in a practical range of from between about 5 to 60%, while the balance comprises the volatile solvent. The solvent content, of course, is selected based upon the intended method of application.

It will be appreciated that various modifications may be made from this description without departing from the spirit and scope of the invention.

I claim:

1. A normally inert coating composition activatable under hand heat and pressure to form a tacky film and adapted for application to gripping handles of hand-held instruments and comprising a composition having the formulation:

| Component | Parts by Weight |
|---|---|
| coumarone-indene resin having a softening point of about 60° C. | 6 to 12 |
| Pentaerythritol ester of rosin having a softening point of about 105° C. | 8 to 12 |
| Aliphatic hydrocarbon solvent | balance |

2. A normally inert coating composition activatable under hand heat and pressure to form a tacky film and adapted for application to gripping handles of hand-held instruments and comprising a composition having the formulation:

| Component | Parts by Weight |
|---|---|
| Coumarone-indene resin having a softening point of about 60° C. | 6 to 12 |
| An ester of rosin selected from the group consisting of pentaerythritol ester of rosin having a softening point of about 105° C. and glycerol ester of polymerized rosin having a softening point of about 114° C. | 8 to 12 |
| Aliphatic hydrocarbon solvent | balance |

3. The coating composition of claim 2 being particularly characterized in that said formulation is dispersed in a propellant for propelling in aerosol form.

* * * * *

UNITED STATES PATENT OFFICE
CERTIFICATE OF CORRECTION

PATENT NO. : 4,020,029
DATED : April 26, 1977
INVENTOR(S) : Walter Gorbunow

It is certified that error appears in the above-identified patent and that said Letters Patent are hereby corrected as shown below:

Column 1, line 66, after "55° C." insert -- and 75° C. --.

Signed and Sealed this fifth Day of July 1977

[SEAL]

Attest:

RUTH C. MASON
*Attesting Officer*

C. MARSHALL DANN
*Commissioner of Patents and Trademarks*